United States Patent [19]

Mendolia

[11] Patent Number: 5,783,327
[45] Date of Patent: Jul. 21, 1998

[54] MODULAR STACKABLE BATTERIES FOR CELLULAR PHONES

[75] Inventor: Gregory S. Mendolia, Forest, Va.

[73] Assignee: Ericsson Inc., Research Triangle Park, N.C.

[21] Appl. No.: 756,687

[22] Filed: Nov. 26, 1996

[51] Int. Cl.[6] .................................................. H01M 2/34
[52] U.S. Cl. ............................ 429/97; 429/123; 439/188
[58] Field of Search ............................ 429/96, 97, 98, 99, 429/100, 123, 65; 439/188

[56] References Cited

U.S. PATENT DOCUMENTS

| | | | |
|---|---|---|---|
| 3,701,074 | 10/1972 | Oster | 439/188 |
| 4,943,498 | 7/1990 | Cooper et al. | 429/123 X |
| 4,965,462 | 10/1990 | Crawford | 307/66 |
| 5,346,786 | 9/1994 | Hodgetts | 429/99 X |
| 5,374,199 | 12/1994 | Chung | 439/188 |
| 5,578,391 | 11/1996 | Meyers et al. | 429/97 |

*Primary Examiner*—Stephen Kalafut
*Attorney, Agent, or Firm*—Nixon & Vanderhye PC

[57] ABSTRACT

A battery is provided for an electronic device that includes contacts on inside and outside surfaces of the battery enabling additional batteries to be stacked on the battery in use. With respect to a cellular phone, this arrangement enables an operator to add additional talk time without requiring the operator to terminate a call. The battery casing is shaped corresponding to the electronic device to maximize battery capacity while minimizing size. In one arrangement, the male terminals that are not in use are retracted within the battery casing, and a sensor assembly senses the attachment of an auxiliary battery and extends the male contacts outside of the battery casing. The configuration allows greater choice of battery capacity and also permits the addition of more batteries as one is depleted.

18 Claims, 2 Drawing Sheets

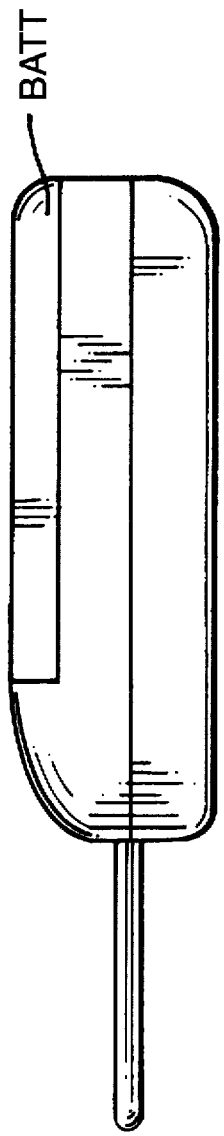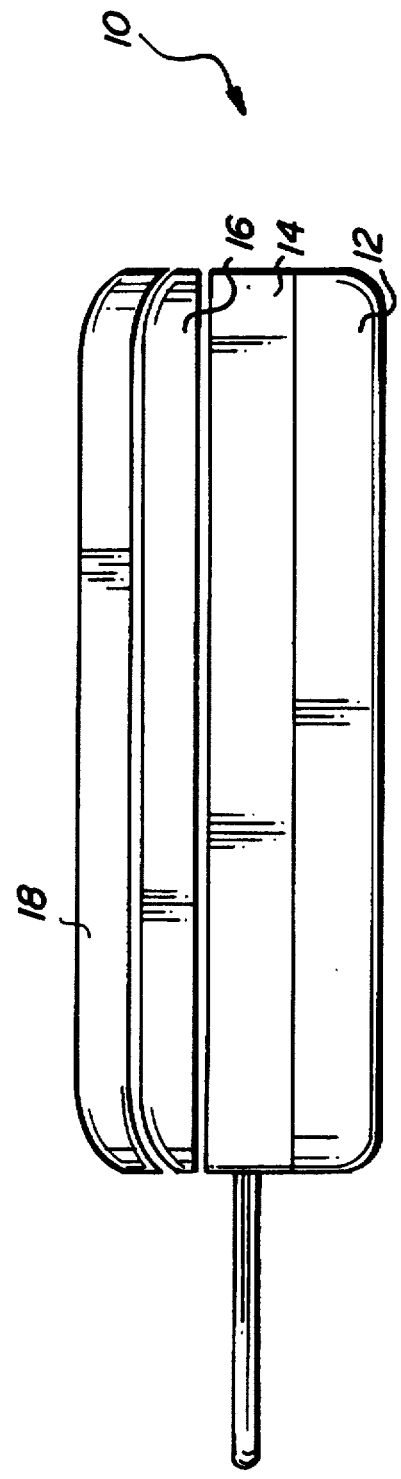

MODULAR STACKABLE BATTERIES FOR CELLULAR PHONES

BACKGROUND OF THE INVENTION

Most cellular phones have their batteries configured such that it is difficult if not impossible to add to or switch a depleted battery with a freshly charged battery without interrupting a call. Some phones utilize awkward auxiliary batteries, while others have a space-consuming capacitor to store enough energy to allow a "quick" battery swap.

Typically, as shown in FIG. 1, cellular phones include batteries that fit within or extend continuously from the contours of the phone itself. Some phones are thus awkwardly shaped to accommodate various size and capacity batteries.

It is known to provide an auxiliary battery for a cellular phone attachable to the phone itself as a backup battery if the primary battery is losing its charge or to increase the phone total talk/standby time. These dual battery configurations, however, typically result in a complex attachment and/or compromise the compact size of the phone. Other configurations use an auxiliary battery that attaches to a separate part of the phone, away from the primary battery. This configuration is both difficult for the user and is not space efficient.

SUMMARY OF THE INVENTION

The present invention proposes the use of "stackable" batteries that can stack on top of one another. The battery side of the cellular phone is designed essentially flat, allowing maximum use of space for battery cells. Electrical connections are provided on both sides of the battery, allowing parallel connection of batteries when stacked on top of one another. Complimentary latching mechanisms are provided on each side of the battery and the cell phone itself to accommodate the stacked configuration.

The stackable battery configuration allows greater choice in overall battery capacity and permits the addition of more batteries as one is depleted, even during a call. There is also no limit to the number of batteries that can be added.

In an exemplary embodiment according to the invention, there is provided a battery for an electronic device including a battery casing housing battery components and having an inside surface and an outside surface. A first pair of electrical contacts is disposed in the inside surface, and a second pair of electrical contacts is disposed in the outside surface. Contacts for temperature sensing/charging can also be incorporated.

In another exemplary embodiment according to the invention, there is provided a battery kit for an electronic device including a plurality of the above-described batteries.

In still another exemplary embodiment, there is provided an electronic device including a device casing housing device components, contact terminals formed in the device casing, and at least a primary battery including a battery casing housing battery components and having an inside surface and an outside surface. The primary battery includes a first pair of electrical contacts disposed in the inside surface and engageable with the contact terminals of the device and a second pair of electrical contacts disposed in the outside surface.

BRIEF DESCRIPTION OF THE DRAWINGS

These and other aspects and advantages of the present invention will be described in detail with reference to the accompanying drawings, in which:

FIG. 1 is a side view of a conventional cellular phone with a battery attached;

FIG. 2 is a side view of a cellular phone including the stackable battery arrangement according to the present invention;

DETAILED DESCRIPTION OF PREFERRED EMBODIMENTS

Figure 3:
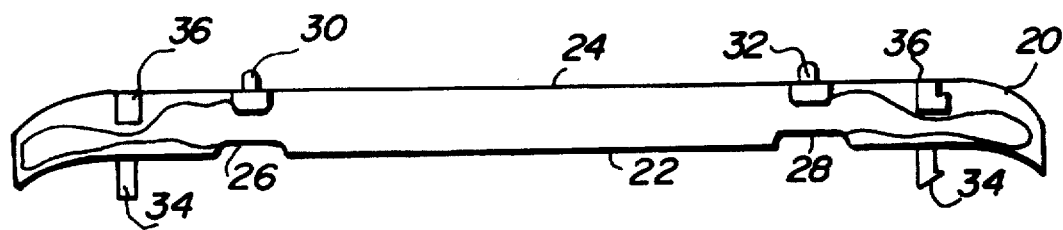
FIG. 3 shows the contacts and latching mechanisms in the battery according to the invention.

In the following description, the battery according to the present invention is described in connection with its application to a cellular phone. This application, however, is merely exemplary for the sake of description as the subject matter according to the invention is applicable to any electronic device utilizing rechargeable batteries. The invention is thus not meant to be limited to the cellular phone application.

In accordance with the present invention, referring to FIG. 2, an electronic device such as a cellular phone is configured to receive "stackable" batteries, which are stackable on top of one another. As shown in FIG. 2, a cellular phone 10 includes a front cover 12 coupled to a rear housing 14, which is adapted to receive a primary or main battery 16 for powering the phone. In preferred embodiments, the phone 10 is designed as thinly and flatly as possible in order to correspondingly design the stackable batteries as thinly and flatly as possible such that a stackable battery kit (including two or more batteries) utilizes the entire surface area of the phone and as little volume as possible and is comfortable to handle.

The primary battery 16 is configured with contacts on either side thereof to accommodate at least one auxiliary battery 18. The primary battery 16 and auxiliary battery 18 are complementary with each other and designed of similar construction. In this context, the manufacturer need only manufacture a single battery type, enabling the user to add as many batteries as desired to the device.

FIG. 3 illustrates the battery according to the present invention. Preferably, in order to minimize the device size, the battery casing 20 is shaped corresponding to the electronic device. As a result, the thickness of the battery can be minimized while maximizing battery capacity. The battery includes an inside surface 22 and an outside surface 24. The inside surface 22 faces the cellular phone or an outside surface of another battery. In the embodiment shown in FIG. 3, female contacts 26 and 28 are formed in the inside surface 22 of the battery. Male contacts 30 and 32 protrude from the outside surface 24. Of course, the male and female contacts could be reversed, and the invention is not meant to be limited to the illustrated configuration. By providing contacts on both sides 22, 24 of the battery, a parallel connection can be made with other batteries. As a result, when the primary battery 16 is depleting, a user can simply attach an auxiliary battery 18 over top of the primary battery ensuring additional power without requiring the user to terminate a call.

In an alternative arrangement, electronic switches and voltage sensors may be added to each battery to disconnect the depleted battery from the remaining parallel-connected charged batteries.

The battery also includes a first latching mechanism 34 attached to the inside surface 22 and a second latching mechanism 36 attached to the outside surface 24. An exemplary peg and post latching mechanism is illustrated schematically in FIG. 3, however, any suitable latching mechanism could be used. The first latching mechanism 34 is complementary with the second latching mechanism 36. With this arrangement, for example, the male post could be slightly deflected with the application of force, thereby enabling the male locking peg to be released from the female catch. The rear housing 14 of the cellular phone 10 includes a latching mechanism similar to the second latching mechanism 36 in order to receive the first latching mechanism 34 of the primary battery. The male latch may be mechanically connected to a release button to allow removal of the battery.

Figure 4A:
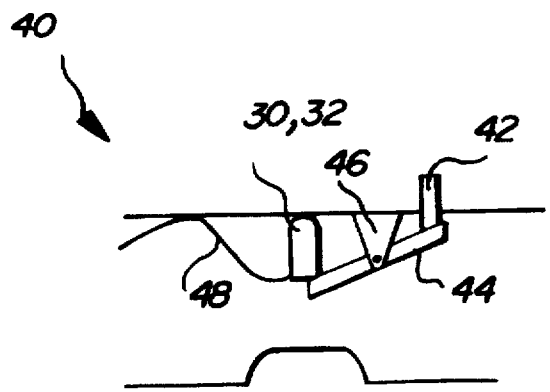
FIGS. 4A and 4B illustrate a sensor assembly in the battery according to the invention.
Figure 4B:
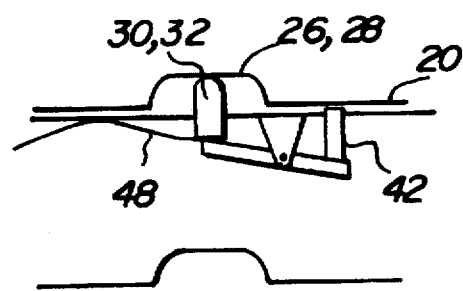

It is desirable to retract the male contacts 30, 32 below the casing surface until another battery is attached in order to minimize potential shorts when a battery has no additional battery attached. Referring to FIGS. 4A and 4B, a sensor assembly 40 is provided for sensing when a battery is attached and for retracting and extending the male contacts. The sensor assembly 40 consists of a pivot sensor having a sensor button 42 attached to a pivot bar 44, which in turn is attached to a pivot bracket 46. A spring 48 is disposed between the pivot bar 44 and the male contacts 30, 32. As shown in FIG. 4A, when a battery is not attached to the current battery, the spring 48 retracts the male contacts 30, 32 and extends the sensor button 42 out of the casing 20. Referring to FIG. 4B, when a battery is attached to the current battery, the battery casing 20 engages the sensor button 42 an d forces the sensor button inside the casing 20 against the force of the spring 48. The pivot bar 44 then extends the male contacts 30, 32 into engagement with the female contacts 26, 28 of the attached battery. Of course, any suitable means for retracting the male contacts could be used, and the invention is not meant to be limited to the described sensor assembly.

The arrangement according to the present invention allows greater choice in overall battery capacity and permits the addition of more batteries as one is depleted, even during a call. Furthermore, there is no limit to the number of batteries that can be added. Thus, the operator of the electronic device can increase or decrease the battery capacity as desired.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A battery for an electronic device comprising:
   a battery casing housing battery components and having an inside surface and an outside surface;
   a first pair of electrical contacts disposed in said inside surface; and
   a second pair of electrical contacts disposed in said outside surface, wherein male contacts of each of said first and second pairs of electrical contacts are disposed within said battery casing.

2. A battery according to claim 1, wherein said battery casing is shaped corresponding to the electronic device.

3. A battery according to claim 1, wherein said first pair of electrical contacts comprises one of male positive and negative contacts, respectively or female positive and negative contacts, respectively, and wherein said second pair of electrical contacts comprises the other of male positive and negative contacts, respectively or female positive and negative contacts, respectively.

4. A battery according to claim 1, further comprising a first latching mechanism attached to said inside surface and a second latching mechanism attached to said outside surface, said second latching mechanism being configured to couple a first latching mechanism of another battery.

5. A battery according to claim 4, wherein said first latching mechanism is configured to couple one of a corresponding latching mechanism on the electronic device or a second latching mechanism of another battery.

6. A battery according to claim 1, further comprising a sensor assembly coupled with each of said male contacts, said sensor assembly including a pivot sensor pivotable between an extended position and a retracted position, wherein in said retracted position, said pivot sensor urges a corresponding male contact out of said battery casing.

7. A battery according to claim 6, wherein each said sensor assembly further comprises a spring member disposed between a corresponding male contact and said pivot sensor, said spring member urging said pivot sensor toward said extended position.

8. A battery kit for an electronic device including a plurality of batteries, each of the batteries comprising:
   a battery casing housing battery components and having an inside surface and an outside surface;
   a first pair of electrical contacts disposed in said inside surface; and
   a second pair of electrical contacts disposed in said outside surface, wherein male contacts of each of said first and second pairs of electrical contacts are disposed within said battery casing.

9. A battery kit according to claim 8, wherein said battery casing is shaped corresponding to the electronic device.

10. A battery kit according to claim 8, wherein said first pair of electrical contacts comprises one of male positive and negative contacts, respectively or female positive and negative contacts, respectively, and wherein said second pair of electrical contacts comprises the other of male positive and negative contacts, respectively or female positive and negative contacts, respectively.

11. A battery kit according to claim 8, wherein each of said batteries further comprises a first latching mechanism attached to said inside surface and a second latching mechanism attached to said outside surface, said second latching mechanism being configured to couple a first latching mechanism of another of said plurality of batteries such that said batteries are stackable upon one another.

12. A battery kit according to claim 11, wherein said first latching mechanism is configured to couple one of a corresponding latching mechanism on the electronic device or a second latching mechanism of said another of said plurality of batteries.

13. A battery kit according to claim 8, wherein each of said batteries further comprises a sensor assembly coupled with each of said male contacts, said sensor assembly including a pivot sensor pivotable between an extended position and a retracted position, wherein in said retracted position, said pivot sensor urges a corresponding male contact out of said battery casing.

14. A battery kit according to claim 13, wherein each said sensor assembly further comprises a spring member disposed between a corresponding male contact and said pivot sensor, said spring member urging said pivot sensor toward said extended position.

15. An electronic device comprising:
   a device casing housing device components;

contact terminals formed in said device casing; and at least a main battery including a battery casing housing battery components and having an inside surface and an outside surface, a first pair of electrical contacts disposed in said inside surface and engageable with said contact terminals, and a second pair of electrical contacts disposed in said outside surface, wherein male contacts of each of said first and second pairs of electrical contacts are disposed within said battery casing.

16. An electronic device according to claim 15, wherein said battery casing is shaped corresponding to the device casing.

17. An electronic device according to claim 15, further comprising at least one auxiliary battery including a battery casing and having an inside surface and an outside surface, a first pair of electrical contacts disposed in said inside surface and engageable with said main battery second pair of contacts, and a second pair of electrical contacts disposed in said outside surface, said second pair of electrical contacts being configured to receive contacts from another battery.

18. An electronic device according to claim 17, wherein said main battery casing and said auxiliary battery casing are shaped corresponding to the device casing.

* * * * *

UNITED STATES PATENT AND TRADEMARK OFFICE
CERTIFICATE OF CORRRECTION

PATENT NO. : 5,783,327
DATED : July 21, 1998
INVENTOR(S) : Gregory S. Mendolia It is certified that error appears in the above-identified patent and that said Letters Patent is hereby corrected as shown below:

Title page, item [56], insert the following:

U. S. PATENT DOCUMENTS

| EXAMINER INITIAL | | PATENT NUMBER | | | | | | ISSUE DATE | PATENTEE | CLASS | SUBCLASS | FILING DATE IF APPROPRIATE |
|---|---|---|---|---|---|---|---|---|---|---|---|---|
| | | 5 | 3 | 1 | 4 | 7 | 6 | 3 | 5/1994 | AKSOY, et al. | | | |
| | | | | | | | | | | | | | |

OTHER DOCUMENTS

| | | |
|---|---|---|
| | | PATENT ABSTRACTS OF JAPAN, vol. 012, no. 215 (E-623), 18 June 1988 & |
| | | JP 63 010460 A (CANON INC.), 18 January 1988, see Abstract. |
| | | PATENT ABSTRACTS OF JAPAN, vol. 096, no. 001, 31 January 1996 & JP 07 240228 A |
| | | (MATSUSHITA ELECTRIC IND. CO. LTD.), 12 September 1995, see Abstract |
| | | PATENT ABSTRACTS OF JAPAN, vol. 096, no. 010, 31 October 1996 & JP 08 148136 A |
| | | (HITACHI KOKI CO. LTD.), 7 June 1996, see Abstract. |
| | | |

Signed and Sealed this

Sixth Day of April, 1999

Attest:

Q. TODD DICKINSON

*Attesting Officer*  *Acting Commissioner of Patents and Trademarks*